(12) United States Patent
West et al.

(10) Patent No.: US 8,844,881 B2
(45) Date of Patent: Sep. 30, 2014

(54) LINE ROUTING CLIP

(75) Inventors: Colin John West, Bristol (GB); David Alistair Sutton, Bristol (GB)

(73) Assignee: Airbus Operations Limited, Bristol (GB)

( * ) Notice: Subject to any disclaimer, the term of this patent is extended or adjusted under 35 U.S.C. 154(b) by 687 days.

(21) Appl. No.: 12/743,870

(22) PCT Filed: Dec. 1, 2008

(86) PCT No.: PCT/GB2008/051137
§ 371 (c)(1),
(2), (4) Date: May 20, 2010

(87) PCT Pub. No.: WO2009/071939
PCT Pub. Date: Jun. 11, 2009

(65) Prior Publication Data
US 2010/0243826 A1  Sep. 30, 2010

(30) Foreign Application Priority Data

Dec. 7, 2007 (GB) .................................. 0723913.0

(51) Int. Cl.
| | |
|---|---|
| *F16L 3/08* | (2006.01) |
| *B65D 63/00* | (2006.01) |
| *H02G 3/00* | (2006.01) |
| *F16L 3/10* | (2006.01) |
| *F16L 55/035* | (2006.01) |

(52) U.S. Cl.
CPC .............. *F16L 3/1041* (2013.01); *H02G 3/263* (2013.01); *F16L 55/035* (2013.01)
USPC .......... 248/74.1; 248/74.2; 248/74.3; 248/69; 24/16 PB; 24/16 R (58) Field of Classification Search
USPC ....................... 248/74.1, 74.2, 74.3, 68.1, 69; 24/16 PB, 16 R, 30.5 P
See application file for complete search history.

(56) References Cited

U.S. PATENT DOCUMENTS 3,292,223 A * 12/1966 Esposito, Jr. .................... 24/487
3,637,177 A *  1/1972 Santucci ...................... 248/74.3
(Continued)

FOREIGN PATENT DOCUMENTS

| AU | 7278381 A | 1/1982 |
| DE | 19716864 A1 | 11/1998 |

(Continued)

OTHER PUBLICATIONS

ISR for PCT/GB2008/051137 dated Mar. 3, 2009.
(Continued)

*Primary Examiner* — Anita M King
(74) *Attorney, Agent, or Firm* — Lowe Hauptman & Ham, LLP (57) ABSTRACT

A routing clip for securing a line to a structure comprising: a base for attaching the clip to a structure; and a clamp comprising: a first flexible strap which extends from the base and has one or more projections extending from its side; and a second flexible strap which extends from the base and has a passageway for receiving the first flexible strap and a locking surface which is arranged to engage one of the projections on the first flexible strap to prevent the first flexible strap from being withdrawn from the passageway. At least part of the clip is made from an elastomeric material.

15 Claims, 7 Drawing Sheets

(56) References Cited

U.S. PATENT DOCUMENTS

| | | | |
|---|---|---|---|
| 3,913,187 A * | 10/1975 | Okuda | 24/484 |
| 4,439,896 A | 4/1984 | Matsui | |
| 4,840,345 A * | 6/1989 | Neil et al. | 248/74.2 |
| 5,372,146 A * | 12/1994 | Branch | 128/898 |
| 5,533,696 A | 7/1996 | Laughlin et al. | |
| 6,149,109 A | 11/2000 | Stankowski | |
| 6,186,454 B1 * | 2/2001 | Olsen | 248/218.4 |
| 6,355,887 B1 * | 3/2002 | Gretz | 174/72 A |
| 6,962,014 B2 * | 11/2005 | McCabe et al. | 40/316 |
| 7,017,237 B2 | 3/2006 | Magno, Jr. et al. | |
| 7,107,653 B2 * | 9/2006 | Thompson | 24/16 PB |
| 7,661,634 B2 * | 2/2010 | Thompson | 248/74.3 |
| 7,685,683 B2 * | 3/2010 | Coles et al. | 24/16 PB |
| 2003/0066366 A1 * | 4/2003 | Buck et al. | 73/866.5 |
| 2004/0111839 A1 | 6/2004 | Sivacoe | |
| 2005/0017133 A1 | 1/2005 | Wochnick | |
| 2005/0224653 A1 | 10/2005 | Miener | |
| 2005/0258315 A1 | 11/2005 | Bigham | |
| 2006/0151674 A1 * | 7/2006 | Hancock | 248/74.3 |
| 2009/0235494 A1 * | 9/2009 | Browne et al. | 24/16 R |
| 2010/0012792 A1 * | 1/2010 | Gollin et al. | 248/74.2 |

FOREIGN PATENT DOCUMENTS

| | | |
|---|---|---|
| DE | 102004045993 A1 | 4/2006 |
| FR | 401093 A | 3/1909 |
| GB | 592666 A | 9/1947 |
| GB | 2068448 A1 | 8/1981 |
| GB | 2285282 A | 7/1995 |
| JP | 06246349 A | 9/1994 |
| JP | 8075052 A | 3/1996 |
| JP | 2000209752 A | 7/2000 |
| WO | 2005075841 A | 8/2005 |

OTHER PUBLICATIONS

British Search Report for GB0723913.0 dated Apr. 1, 2008.

* cited by examiner

LINE ROUTING CLIP

RELATED APPLICATIONS

The present application is based on International Application Number PCT/GB/2008/051137, filed Dec. 1, 2008, and claims priority from British Patent Application Number 0723913.0, filed Dec. 7, 2007, the disclosures of which are hereby incorporated by reference herein in their entirety.

FIELD OF THE INVENTION

The present invention relates to a routing clip for securing a line such as an electrical cable or a hydraulic pipe to a structure.

BACKGROUND OF THE INVENTION

Line routing clips are used extensively in the aerospace industry for securing lines such as pipes, tubing and electrical cables. A common type of clip is a so-called "P-clip". A P-clip consists of a ring-shaped cable clamp, arranged to surround the line, and a tab for receiving a fastener. The fastener attaches the clip to a structure and closes the clamp firmly.

A problem with a conventional P-clip is that a separate fastener must be provided to close the clamp firmly. This increases part count and makes it difficult to fit the clip quickly.

Conventional line routing clips are commonly formed from materials such as Nylon or Aluminium. Such materials can be heavy, can cause fretting of the line(s), and can transmit vibrational loads to the line which may cause damage to the line(s).

SUMMARY OF THE INVENTION

A first aspect of the invention provides a line routing clip comprising a base for attaching the clip to a structure; and a clamp comprising: a first flexible strap which extends from the base and has a plurality of projections extending from its side; and a second flexible strap which extends from the base and has a passageway for receiving the first flexible strap and a locking surface which is arranged to engage one of the projections on the first flexible strap to prevent the first flexible strap from being withdrawn from the passageway, wherein the base, the first flexible strap, the projections extending from the side of the first flexible strap, and the second flexible strap are made from an elastomeric material and formed as a single moulded piece; and wherein the projections on the first strap are resilient to enable them to retract to permit the first strap to pass through the passageway before expanding again to engage with the locking surface on the second strap.

The first aspect of the invention provides a locking mechanism which is integrated into the structure of the straps, reducing part count compared with a conventional P-clip and making assembly easier and quicker.

Various preferred locking mechanisms are set out in the description of the preferred embodiments, and in the dependent claims.

By constructing the clip using elastomeric material, the clip has a lightweight design and provides vibrational damping to reduce loads on the line held by the clip. The use of elastomeric material also reduces the risk of fretting associated with nylon or aluminium clips.

A further aspect of the invention provides a system securing a bundle of lines to a structure, the system comprising the line routing clip of the first aspect with the base of the clip attached to the structure; and a bundle of lines positioned between the first and second flexible straps. The first strap is prevented from being withdrawn from the passageway in the second strap by the engagement of one of the projections extending from the side of the first strap and the locking surface on the second strap.

A further aspect of the invention provides a method of securing a bundle of lines to a structure using a line routing clip according to the first aspect, the method comprising: attaching the base of the line routing clip to the structure; placing the bundle of lines between the first and second flexible straps; and clamping the bundle of lines in place by inserting the first strap through the passageway in the second strap, and preventing the first strap from being withdrawn from the passageway by engaging one of the projections on the first flexible strap with the locking surface.

The clip is typically used to secure a line to an aircraft structure such as a wing spar. However the invention is also applicable to a number of other different areas outside the aerospace industry, including automotive, marine, train or construction (such as masts or aerials).

The line secured by the clip may be for example an electrical or fibre-optic cable, or a hydraulic pipe.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
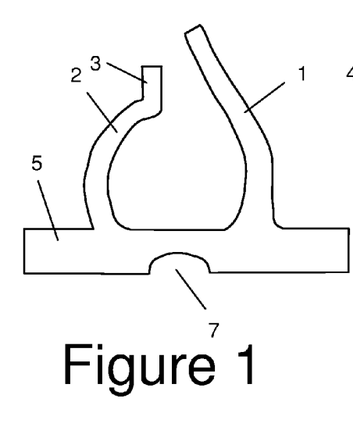
FIG. 1 schematically illustrates the structure of a first routing clip design in its relaxed (unbent) state as viewed from the front.
Figure 2:
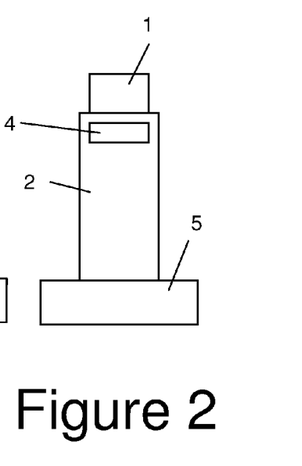
FIG. 2 schematically illustrates the clip shown in FIG. 1 as viewed from the side.
Figure 3:
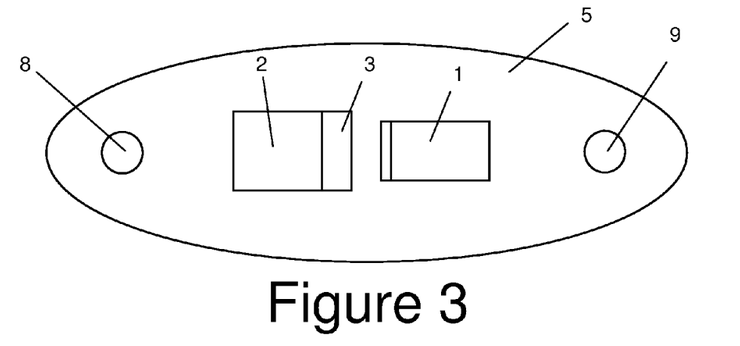
FIG. 3 schematically illustrates the clip shown in FIG. 1 in a plan view.

The routing clip shown schematically in FIGS. 1-4 comprises a base 5 for attaching the clip to a structure 11; and a clamp comprising a first flexible strap 1 and a second flexible strap 2 which extend from the base 5 as shown in FIG. 1 when they are in their relaxed (unbent) state. The second flexible strap 2 has a distal end 3 which contains a passageway 4.

Figure 4:
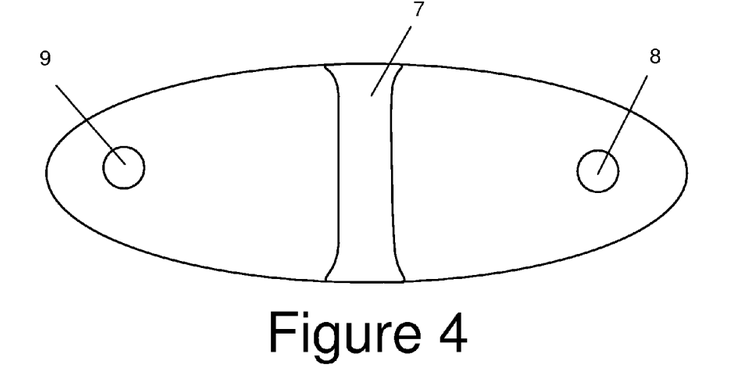
FIG. 4 schematically illustrates the clip shown in FIG. 1 from beneath the base.

The base 5 has a first portion positioned on a first side of the clamp, and a second portion positioned on a second side of the clamp opposite the first side. As shown in FIG. 4, each portion of the base has a respective hole 8, 9, each sized to receive a respective fastener 12, 13 in order to attach the clip to a structure 11. The base 5 has a crack-arresting channel 7 which is positioned between the holes 8, 9.

Figure 5:
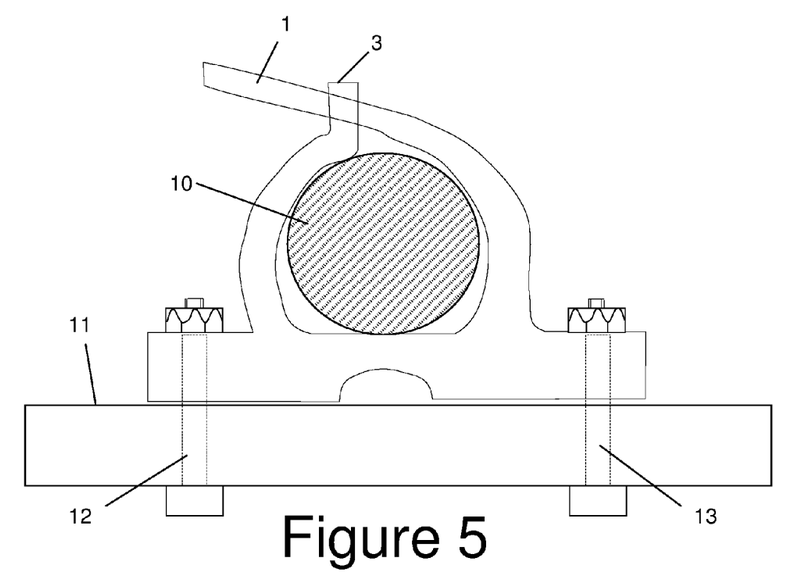
FIG. 5 schematically illustrates the clip shown in FIG. 1 with its base secured to a structure with a pair of fasteners and a line (or bundle of lines) secured within the clamp.

After the base 5 has been secured to the structure 11, a flexible line 10 (or bundle of lines) is placed between the first and second flexible straps as shown in FIG. 5. The line 10 is then clamped in place by pulling the first strap 1 through the passageway 4 in the second strap 2. The withdrawal of the first strap 1 from the passageway 4 is prevented by a "christmas tree" locking mechanism which is shown in FIG. 6.

Figure 6:
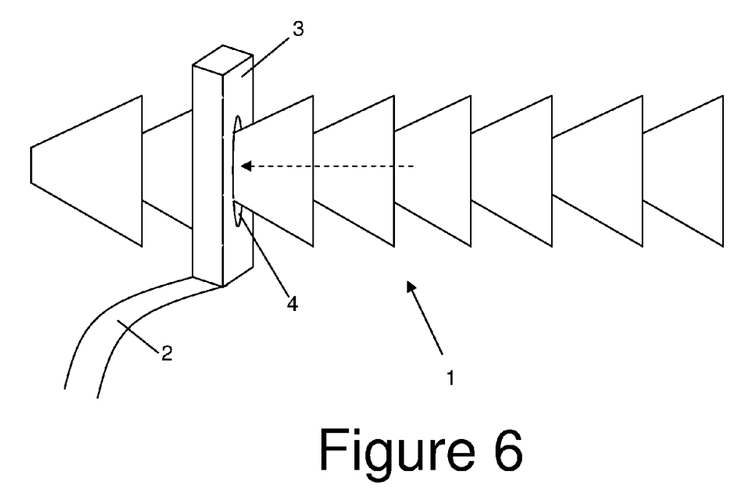
FIG. 6 is a close-up illustration of the end of the first strap as it passes through the passageway in the second strap.

At the distal end of the first flexible strap 1, a series of projections in the shape of truncated cones extend from its side, as shown in FIG. 6. The truncated tip of each cone is narrower than the passageway 4, while the base of each cone is wider than the passageway 4. The elastomeric material forming the strap is sufficiently resilient to enable the cones to retract to pass through the passageway 4 in one direction. Once the cones have passed through the passageway 4, they expand again back to their original size. If a force is then applied to the first strap 1 in the opposite direction, the perimeter of passageway 4 provides a locking surface which engages with the base of one of the cones to prevent the withdrawal of the first strap 1 from the passageway 4. If required, the first strap 1 can be withdrawn from the passageway 4 by first pinching the bases of the cones so that they retract sufficiently to pass through the passageway and then pulling the strap back through the passageway 4. Thus, the locking mechanism is releasable.

Figure 7:
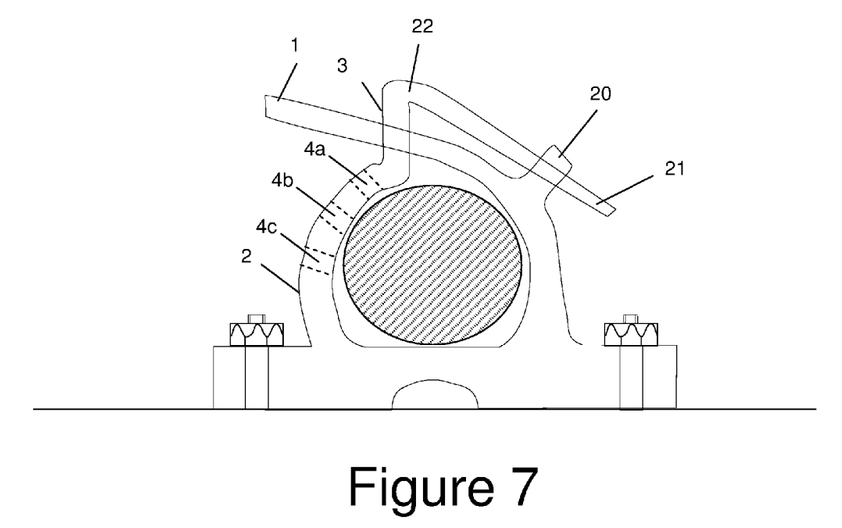
FIG. 7 schematically illustrates a first alternative version of the clip with a cross-over strap design and a redundant locking mechanism, as viewed from the front.

A first alternative clip is shown in FIG. 7. The clip is similar to that shown in FIGS. 1-5 and the same reference numerals will be used for equivalent features. In this case the first strap 1 further comprises a tab 20 which extends from the side of the strap at an intermediate position along its length. The tab 20 has a second passageway (not shown) for receiving the second flexible strap 2. Here, the distal end 21 of the second strap 2 also has a series of projections extending from its side, again in the shape of truncated cones. The second strap 2 is prevented from being withdrawn from the passageway in the tab 20 by a 'christmas tree' locking mechanism of the kind shown in FIG. 6 and described above. This additional locking mechanism provides redundancy in the assembly and may prevent the need for an additional clip to be used at substantially the same point to meet the redundancy requirements of aerospace manufacturing standards. The cross-over strap configuration offers an additional benefit as it helps to even out the load experienced by the line(s) being held within the clip.

The clip of FIG. 7 also has thee additional passageways 4a,4b and 4c along the length of the strap 2, in addition to the passageway 4 which is shown receiving the first strap 1. If a smaller cable (or bunch of cables) is to be held, then the strap 1 can be locked using a selected one of these additional passageways 4a-4c.

Figure 8:
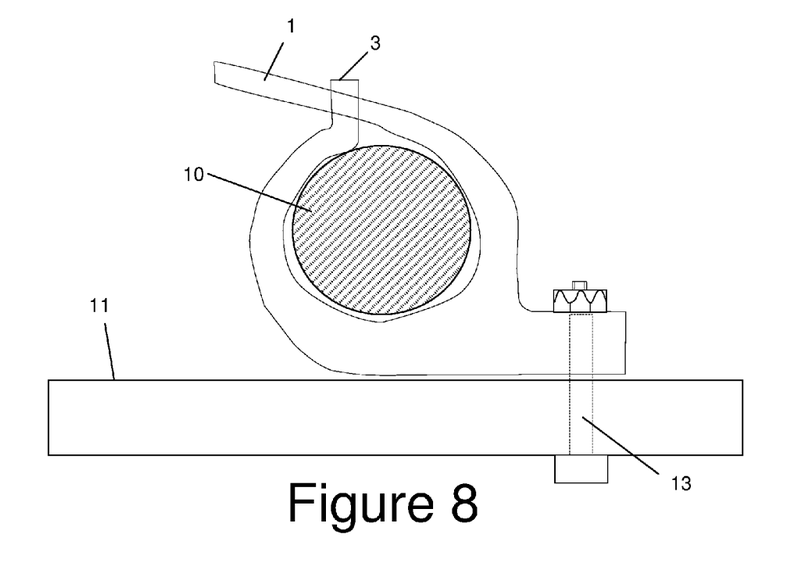
FIG. 8 schematically illustrates a second alternative version of the clip design FIG. 9 schematically illustrates a third alternative version of the clip design where the position of the first and second straps is reversed and its base is secured to a structure with adhesive, as viewed from the front.

A second alternative clip is shown in FIG. 8. The clip is similar to that shown in FIGS. 1-5 and the same reference numerals will be used for equivalent features. In this case, the left hand portion of the base is omitted, and only a single fastener 13 is used to attach the clip to the structure 11.

Figure 9:
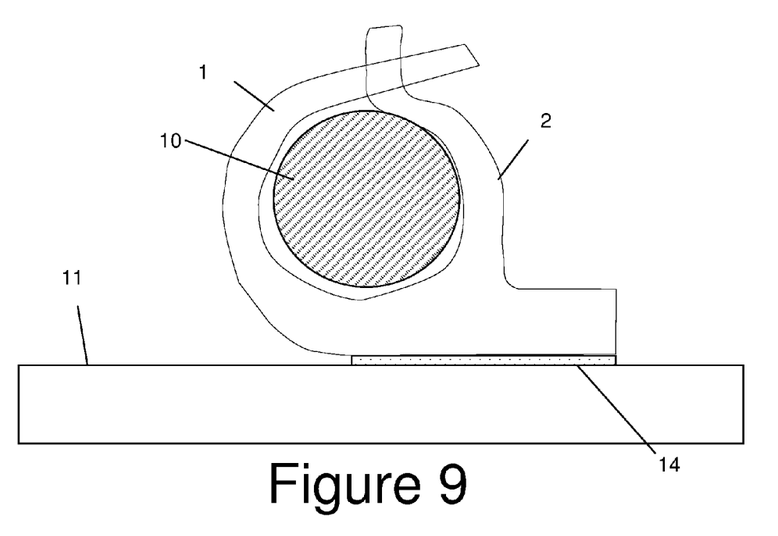

A third alternative clip is shown in FIG. 9. The clip is similar to that shown in FIG. 8 and the same reference numerals will be used for equivalent features. In this case, the relative positions of the first strap 1 and the second strap 2 are reversed. Also, rather than using fasteners, the base of the clip is adhesively bonded to the structure 11. This can be done either via a pre-prepared adhesive patch positioned on the base of the clip, or simply by applying an adhesive layer 14 directly to the base at the time of bonding.

Figure 10:
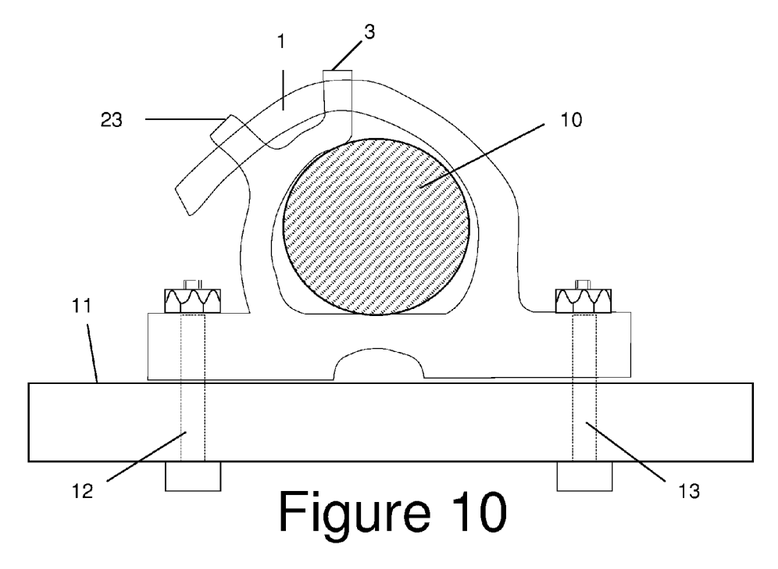
FIG. 10 schematically illustrates a fourth alternative version of the clip design which contains an added tab on the second strap with a second passageway for receiving the first strap after it has passed through the first passageway to provide a redundant locking mechanism, as viewed from the front.

A fourth alternative clip is shown in FIG. 10. The clip is similar to that shown in FIGS. 1-5 and the same reference numerals will be used for equivalent features. In this case, the second strap 2 has an additional tab 23 which has a passageway for receiving the first flexible strap 1 after it has passed through the passageway 4 in the second flexible strap 2. The passageway in the tab 23 is of the same design as the passageway 4 and the first flexible strap 1 is thus able to pass through it in one direction and is prevented from being withdrawn by a 'christmas tree' type locking mechanism as described above. This additional locking surface provides redundancy in the assembly and may prevent the need for an additional clip to be used at substantially the same point to meet the redundancy requirements of aerospace manufacturing standards.

Figure 11:
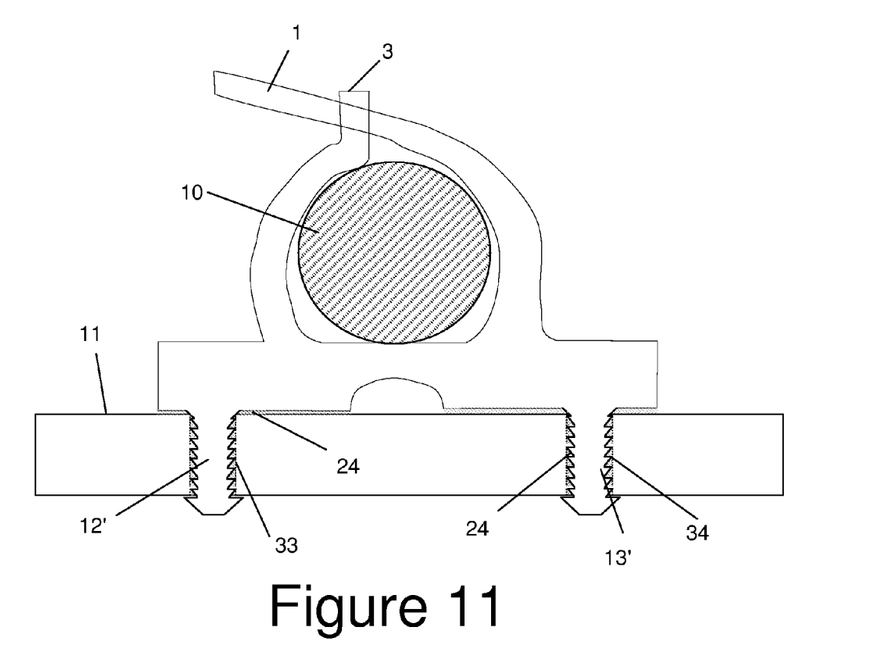
FIG. 11 schematically illustrates a fifth alternative version of the clip design where connecting members are integrally formed with the base of the clip to attach it to a structure, as viewed from the front.

A fifth alternative clip is illustrated in FIG. 11. The clip is again similar to that shown in FIGS. 1-5 and the same reference numerals will be used for equivalent features. In this case, two connecting members 12', 13' are integrally formed with the base of the clip for attaching the clip to a structure 11. The connecting members are designed to lock onto the structure 11 using the "christmas tree" type locking mechanism as described above. A series of projections in the shape of truncated cones extend from the side of each connecting member 12', 13' and two holes 33, 34 are drilled into the structure 11. The truncated tips of the cones are narrower than the holes 33, 34 while the bases of the cones are wider than the holes 33, 34. The bases of the cones are sufficiently resilient to enable them to retract to pass through the holes 33, 34 in one direction and once the cones have passed through the holes 33, 34 they expand again back to their original size. If a force is then applied to the clip in the opposite direction, the base of one of the cones on each connecting member 12',13' engages with the perimeter of their respective holes 33, 34 preventing the removal of the clip from the structure 11. In this way, the perimeters of the holes 33, 34 in the structure act as locking surfaces to prevent the withdrawal of the connecting members 12', 13'.

The connecting members 12', 13' are further supported by adhesive 24, both between the base of the clip 5 and the structure 11 and between the connecting members 12', 13' and the internal walls of the holes 33, 34 as illustrated in FIG. 11. The adhesive further increases the strength of the connection between the clip and the structure.

Note that access to only the upper side of the structure 11 is required in order to install the clip of FIG. 11 to the structure 11.

Figure 12:
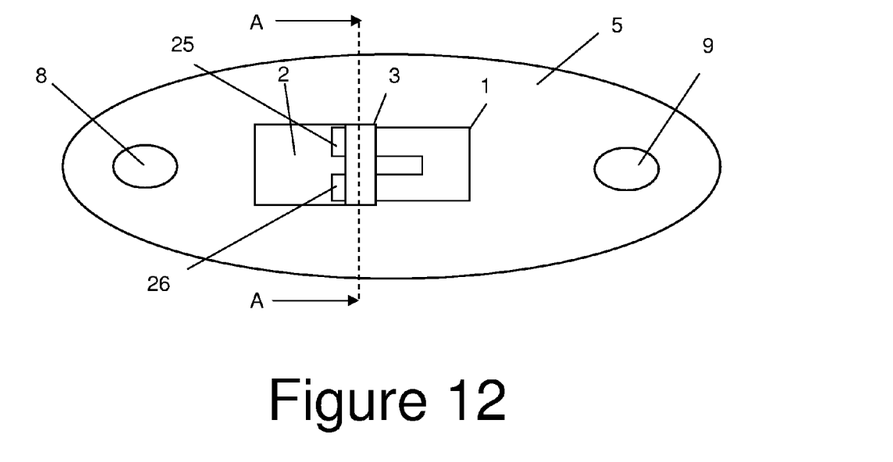
FIG. 12 shows a plan view of a sixth alternative clip design, where the first strap splits to form two distal arms which are received in a passageway on the second strap.
Figure 13:
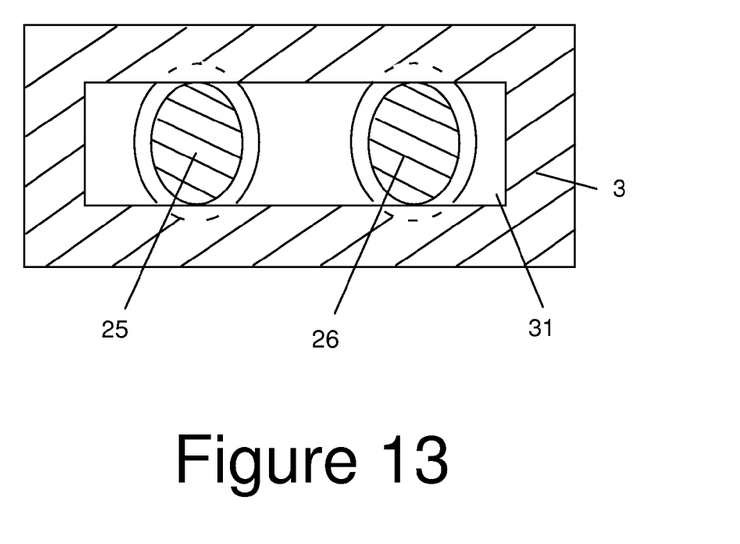
FIG. 13 is a cross-sectional view of the passageway(s) on the second strap of the clip shown in FIG. 12 along a section line A.

A sixth alternative clip is illustrated in FIGS. 12 and 13. FIG. 12 shows the clip in a plan view, while FIG. 13 shows a cross sectional view of the clip along the axis A, as indicated in FIG. 12. In this case, the first flexible arm 1 splits into two distal arms 25, 26. Both distal arms 25, 26 have a series of projections extending from their sides, each projection again taking the frustoconical shape illustrated in FIG. 6. The passageway 31 in the second arm 2 is sized to receive both distal arms 25, 26. After the resilient, truncated cones have retracted to pass through the passageway 31, they expand again to their original size. If a force is then applied to withdraw the distal arms 25, 26 from the passageway 31, the perimeter of the passageway 31 provides a locking surface to engage with the base of one of the truncated cones extending from each of the two distal arms 25, 26, preventing them from being withdrawn from the passageway 31. The second flexible arm 2 may alternatively have two separate passageways each receiving a respective one of the two arms 25, 26.

Figure 14:
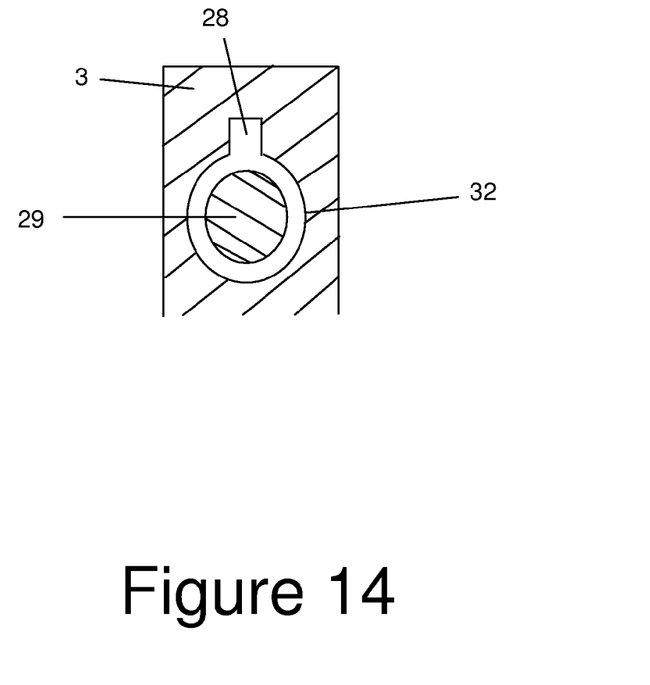
FIG. 14 shows an alternative locking mechanism comprising a passageway which has a notch arranged to receive a section of the first strap between two adjacent projections extending from its side.
Figure 15A:
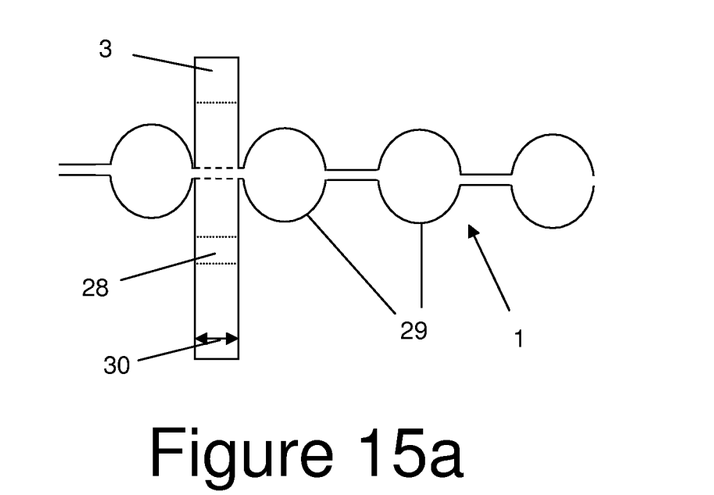
FIG. 15a illustrates the alternative locking mechanism of FIG. 14 from the side and is shown with the first strap passing through the passageway.
Figure 15B:
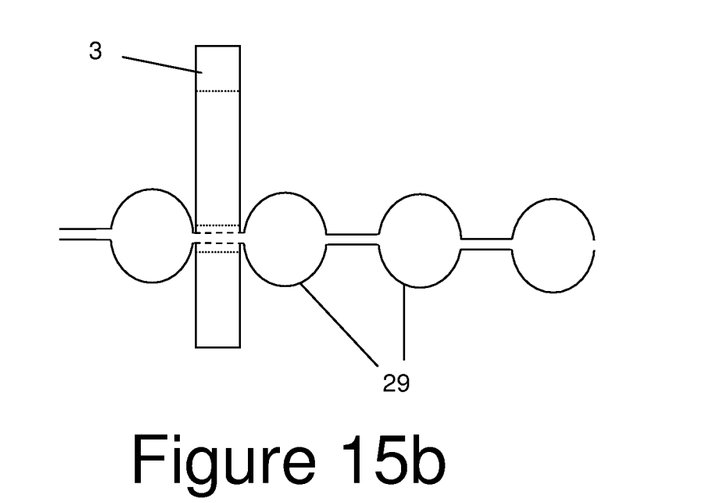
FIG. 15b illustrates the same view as FIG. 15a but with a length of the first strap between two adjacent projections positioned in the notch.

An alternative form which may be taken by the locking mechanism(s) in any of the previously described clips is illustrated in FIGS. 14 and 15. FIG. 14 provides a close-up illustration of a passageway 32, while FIGS. 15a and 15b show a side view. In this case, the first strap 1 has a series of hemispherical projections 29 extending from its side, with each projection being separated by a narrower length. Referring to FIG. 14, the passageway 32 is sized to receive the projections 29 and it also has a notch 28 sized to receive the narrower length of the first flexible strap between adjacent projections 29. Each adjacent projection is separated by a length of the first flexible strap which is equal to or greater in length than the depth 30 of the passageway 32, as seen in FIGS. 15a and 15b. Thus, when the first strap 1 is passed through the passageway 32, a length of the first strap 1 between two adjacent projections can be slid up into the notch. Due to the stretching of the first flexible strap 1 when the clamping mechanism is tightened, there will be a force trying to retract the first flexible strap 1 back to its relaxed state. However, when the strap is positioned in the notch 28, this retracting force presses one of the projections 29 on the first strap 1 against the perimeter of the notch 28. In this way, the perimeter of the notch 28 in the passageway 32 provides a locking surface which prevents the first strap 1 from being withdrawn from the passageway 32, holding the clamp together.

Note that the notch 28 is positioned towards the distal end of the strap so that the cable (which is below the strap 3 in the view of FIG. 14 but above the strap 3 in the view of FIGS. 15a and 15b) will apply a force which tends to push the strap further into the notch.

Another alternative form which may be taken by the locking mechanism is a ratchet and pawl, as in a conventional cable-tie for instance as described in U.S. Pat. No. 7,017,237. In this case, the passageway 4 has a pawl which partially obstructs the passageway 4, deforms to permit the first flexible strap 1 to be inserted therein and engages one of the projections on the first flexible strap 1 to prevent the first flexible strap 1 from being withdrawn from the passageway 4.

Although three methods have been described for locking together the first and second straps, it will be appreciated that other suitable locking mechanisms may be used.

The clips described above are formed as a single moulded piece, and may be formed from a variety of elastomeric materials such as hard polyurethane; nitrile rubber; ethylene propylene diene monomer (EPDM); or thermoplastic elastomer (TPE).

The most appropriate material for the construction of the clip depends on its particular application. Elastomers are particularly attractive as they enjoy many of the benefits of PTFE—for example, they are non-conducting and non-corrosive—whilst they also provide a level of vibration damping which can remove some of the load on the routed lines. Moreover the fretting problems associated with the interaction between, for example, electrical cables and materials such as nylon and aluminium, which are commonly used to make existing line-clips, are avoided by manufacturing the line clip with elastomer. Finally, it should be noted that elastomers further enjoy the benefit of being lightweight which can be of critical importance in a number of applications, such as in the aerospace industry, where many such clips are required and weight is a critical factor.

Although the invention has been described above with reference to one or more preferred embodiments, it will be appreciated that various changes or modifications may be made without departing from the scope of the invention as defined in the appended claims.

The invention claimed is:

1. A line routing clip, comprising:
a base for attaching the clip to a structure; and
a clamp comprising:
a first flexible strap which extends from the base and has a plurality of projections extending from its side;
a second flexible strap which extends from the base and has a passageway for receiving the first flexible strap and a locking surface which is arranged to engage one of the projections on the first flexible strap to prevent the first flexible strap from being withdrawn from the passageway; and,
wherein the base, the first flexible strap, the projections extending from the side of the first flexible strap, and the second flexible strap are made from an elastomeric material and formed as a single molded piece for providing vibration damping; and wherein the projections on the first strap are resilient to enable them to retract to permit the first strap to pass through the passageway before expanding again to engage with the locking surface on the second strap.

2. The clip of claim 1 wherein the base has one or more holes, each adapted to receive a respective fastener.

3. The clip of claim 2 wherein the base has two or more holes, each adapted to receive a respective fastener.

4. The clip of claim 1 wherein the base has a crack-arresting channel.

5. The clip of claim 1 wherein the passageway in the second strap comprises a notch sized to receive a length of the first flexible strap between two adjacent projections.

6. The clip of claim 1 wherein the base has a first portion positioned on a first side of the clamp, and a second portion positioned on a second side of the clamp opposite to the first side.

7. The clip of claim 6 wherein each portion of the base has at least one hole adapted to receive a respective fastener.

8. The clip of claim 1 wherein at least one connecting member is integrally formed with the base of the clip for attaching the clip to a structure.

9. An aircraft structure including the line routing clip of claim 1.

10. A system securing a bundle of lines to a structure, the system comprising the line routing clip of claim 1 wherein:
   the base of the clip is attached to the structure;
   the bundle of lines is clamped between the first and second flexible straps; and
   the first strap is prevented from being withdrawn from the passageway in the second strap by the engagement of one of the projections extending from the side of the first strap with the locking surface on the second strap.

11. A method of securing a bundle of lines to a structure using the line routing clip of claim 1, the method comprising:
   attaching the base of the line routing clip to the structure;
   placing the bundle of lines between the first and second flexible straps; and
   clamping the bundle of lines in place by inserting the first strap through the passageway in the second strap, and preventing the first strap from being withdrawn from the passageway by engaging one of the projections on the first flexible strap with the locking surface, wherein the projections on the first strap resiliently retract to enable the first strap to pass through the passageway before expanding again to engage with the locking surface of the second strap.

12. A line routing clip, comprising:
   a base for attaching the clip to a structure; and
   a clamp comprising:
   a first flexible strap which extends from the base and has a plurality of projections extending from its side;
   a second flexible strap which extends from the base and has a passageway for receiving the first flexible strap and a locking surface which is arranged to engage one of the projections on the first flexible strap to prevent the first flexible strap from being withdrawn from the passageway; and,
   wherein the base, the first flexible strap, the projections extending from the side of the first flexible strap, and the second flexible strap are made from an elastomeric material and formed as a single molded piece; and wherein the projections on the first strap are resilient to enable them to retract to permit the first strap to pass through the passageway before expanding again to engage with the locking surface on the second strap, and wherein the first flexible strap splits to form two distal arms, each arm having one or more projections extending from its side.

13. The clip of claim 12 wherein the second strap contains two passageways, each for receiving a respective one of the distal arms.

14. A line routing clip, comprising:
   a base for attaching the clip to a structure; and
   a clamp comprising:
   a first flexible strap which extends from the base and has a plurality of projections extending from its side; and
   a second flexible strap which extends from the base and has a passageway for receiving the first flexible strap and a locking surface which is arranged to engage one of the projections on the first flexible strap to prevent the first flexible strap from being withdrawn from the passageway;
   wherein the base, the first flexible strap, the projections extending from the side of the first flexible strap, and the second flexible strap are made from an elastomeric material and formed as a single molded piece; and wherein the projections on the first strap are resilient to enable them to retract to permit the first strap to pass through the passageway before expanding again to engage with the locking surface on the second strap, and wherein
   the second strap has one or more projections extending from its side; and
   the first strap further comprises a tab which extends from a side of the first flexible strap at an intermediate position along its length, and has a second passageway for receiving the second flexible strap and a locking surface which is arranged to engage one of the projections on the second flexible strap to prevent the second flexible strap from being withdrawn from the passageway.

15. A line routing clip, comprising:
   a base for attaching the clip to a structure; and
   a clamp comprising:
   a first flexible strap which extends from the base and has a plurality of projections extending from its side;
   a second flexible strap which extends from the base and has a passageway for receiving the first flexible strap and a locking surface which is arranged to engage one of the projections on the first flexible strap to prevent the first flexible strap from being withdrawn from the passageway;
   wherein the base, the first flexible strap, the projections extending from the side of the first flexible strap, and the second flexible strap are made from an elastomeric material and formed as a single molded piece; and wherein the projections on the first strap are resilient to enable them to retract to permit the first strap to pass through the passageway before expanding again to engage with the locking surface on the second strap, and wherein the second flexible strap has one or more further passageways for receiving the first flexible strap, each being associated with a respective further locking surface which is arranged to engage one of the projections on the first flexible strap to prevent the first flexible strap from being withdrawn from the passageway.

* * * * *